(12) United States Patent
Yao et al.

(10) Patent No.: US 10,708,006 B2
(45) Date of Patent: Jul. 7, 2020

(54) COMMUNICATION DEVICE, AND COMMUNICATION METHOD FOR FRAME AGGREGATION AND TRANSMISSION

(71) Applicant: XIDIAN UNIVERSITY, Xi'an, Shaanxi (CN)

(72) Inventors: Mingwu Yao, Shaanxi (CN); Jilong Liu, Shaanxi (CN); Zhiliang Qiu, Shaanxi (CN)

(73) Assignee: XIDIAN UNIVERSITY, Xi'an (CN)

( * ) Notice: Subject to any disclaimer, the term of this patent is extended or adjusted under 35 U.S.C. 154(b) by 58 days.

(21) Appl. No.: 15/776,874

(22) PCT Filed: Jul. 14, 2016

(86) PCT No.: PCT/CN2016/090017
§ 371 (c)(1),
(2) Date: May 17, 2018

(87) PCT Pub. No.: WO2017/084364
PCT Pub. Date: May 26, 2017

(65) Prior Publication Data
US 2018/0337753 A1 Nov. 22, 2018

(30) Foreign Application Priority Data

Nov. 17, 2015 (CN) .......................... 2015 1 0789981

(51) Int. Cl.
*H04L 1/18* (2006.01)
*H04L 1/00* (2006.01)
(Continued)

(52) U.S. Cl.
CPC .......... *H04L 1/1861* (2013.01); *H04L 1/0007* (2013.01); *H04L 1/08* (2013.01);
(Continued)

(58) Field of Classification Search
CPC ....... H04L 1/1861; H04L 1/20; H04L 1/1607; H04L 1/08; H04L 1/1614; H04L 1/0007;
(Continued)

(56) References Cited

U.S. PATENT DOCUMENTS

2009/0059877 A1 3/2009 Utsunomiya et al.
2015/0295680 A1* 10/2015 Othman ................ H04L 1/1614
370/329

(Continued)

FOREIGN PATENT DOCUMENTS

| CN | 102355324 A | 2/2012 |
| CN | 104219025 A | 12/2014 |
| KR | 20130126415 A | 11/2013 |

OTHER PUBLICATIONS

International Search Report in PCT/CN2016/090017 dated Oct. 19, 2016, 4 pages.
(Continued)

*Primary Examiner* — Jae Y Lee
(74) *Attorney, Agent, or Firm* — Metis IP LLC

(57) ABSTRACT

A method for transmitting an aggregated frame is disclosed. The method includes: estimating channel condition; comparing the channel condition with first threshold for selecting an aggregation scheme; and comparing the channel condition with second threshold, which is different with the first threshold, for selecting an aggregation scheme; performing the aggregation using the selected aggregation scheme with position information, which indicates the positions of sub-frame in the aggregated frame.

16 Claims, 13 Drawing Sheets

(51) Int. Cl.
*H04L 1/16* (2006.01)
*H04L 1/08* (2006.01)
*H04L 1/20* (2006.01)

(52) U.S. Cl.
CPC .......... *H04L 1/1607* (2013.01); *H04L 1/1614* (2013.01); *H04L 1/20* (2013.01)

(58) Field of Classification Search
CPC . H04L 47/2466; H04L 1/1858; H04L 1/1664; H04L 1/0083; H04L 1/0008
See application file for complete search history.

(56) References Cited

U.S. PATENT DOCUMENTS

2017/0141903 A1* 5/2017 Xu .................... H04W 72/0446
2017/0289844 A1* 10/2017 Son ....................... H04W 28/06

OTHER PUBLICATIONS

Written Opinion of the International Searching Authority in PCT/CN2016/090017 dated Oct. 19, 2016, 3 pages.

\* cited by examiner

COMMUNICATION DEVICE, AND COMMUNICATION METHOD FOR FRAME AGGREGATION AND TRANSMISSION

CROSS-REFERENCE TO RELATED APPLICATION

This application is a U.S. national stage under 35 U.S.C. § 371 of International Application No. PCT/CN2016/090017, filed on Jul. 14, 2016, designating the United States of America, which claims the benefit of Chinese Patent Application No. 201510789981.7, filed on Nov. 17, 2015, which is hereby incorporated by reference herein in its entirety.

TECHNICAL FIELD

The present disclosure generally relates to wireless communications. More particularly, the present disclosure relates to frame aggregation and transmission utilizing an adaptive scheme.

BACKGROUND

Media Access Control (MAC) provides mechanisms for enabling multiple communication devices to communicate with each other while sharing the same medium. For example, if two or more communication devices transmit communication data (or management frames) using the same medium at the same time, a communication device on the receiving side may not be able to decode communication data. This may reduce the throughput of the communication device. Frame aggregation schemes can be used to increase throughput of a communication system. For example, data frames (e.g., packets) lost in a transmission may be aggregated and retransmitted. However, the performance of conventional frame aggregation schemes may be significantly affected by channel conditions. When a transmission error occurs, the retransmission efficiency and reliability of the conventional frame aggregation schemes may be reduced greatly. For example, when the channel is not in good condition, the throughput of the conventional frame aggregation schemes may fail to meet user expectations. Additionally, the conventional frame aggregation schemes also suffer from huge aggregation overheads, large delay, serious retransmission overheads, and other disadvantages.

Therefore, new mechanisms for frame aggregation and transmission are desirable.

SUMMARY

In some embodiments, a system for frame aggregation and transmission is disclosed. The system may include a memory and a processor operatively coupled to the memory. The processor may be configured or used to estimate a channel condition metric indicative of at least one channel condition; select at least one frame aggregation scheme from a plurality of aggregation schemes based on the channel condition metric; and perform frame aggregation based on the selected frame aggregation scheme.

In some embodiments, the processor may be further to receive an acknowledge message including information indicative of receipt of at least sub-frame of a first frame and determine the channel condition metric based on the acknowledge message.

In some embodiments, the acknowledgement message may include a BlockACK.

In some embodiments, the processor may be further operative to identify at least one sub-frame of the first frame based on a bit map in the acknowledgement message, wherein the bit map comprises position information related to the sub-frame and aggregate the identified sub-frame into a second frame for retransmission.

In some embodiments, the sub-frame is identified based on a bit value of a position in the bitmap that corresponds to the sub-frame.

In some embodiments, the position information is included in a MAC header of the sub-frame.

In some embodiments, the processor may be configured to compare the channel condition metric with a first threshold and may select the at least one frame aggregation scheme based on the comparison.

In some embodiments, the processor may be configured to compare the channel condition metric with a second threshold and then select the at least one frame aggregation scheme in response to determining that the channel condition metric is not less than the first threshold and that the channel condition metric is not greater than the second threshold.

In some embodiments, the second threshold is greater than the first threshold.

In some embodiments, the channel condition metric is a bit error rate.

In some embodiments, the plurality of aggregation schemes includes at least one of a two-level aggregation scheme or an A-MPDU aggregation scheme.

In some embodiments, the two-level aggregation scheme includes a MSAL strategy aggregation scheme and a BFAS strategy aggregation scheme.

In some embodiments, the MSAL strategy aggregation scheme may provide a higher throughput than the BFSA strategy aggregation scheme.

In some embodiments, the MSAL strategy aggregation scheme may decrease first stage aggregation frame length of the two-level aggregation scheme.

In some embodiments, the BFSA strategy aggregation scheme may perform first stage frame aggregation of the two-level aggregation scheme based on a maximum frame length.

BRIEF DESCRIPTION OF THE DRAWINGS

The accompanying drawings, which are incorporated in and constitute a part of this specification, illustrate several embodiments of the disclosure and together with the description, serve to explain the principles of the disclosure. In the drawings.

DETAILED DESCRIPTION OF THE DISCLOSURE

Figure 1:
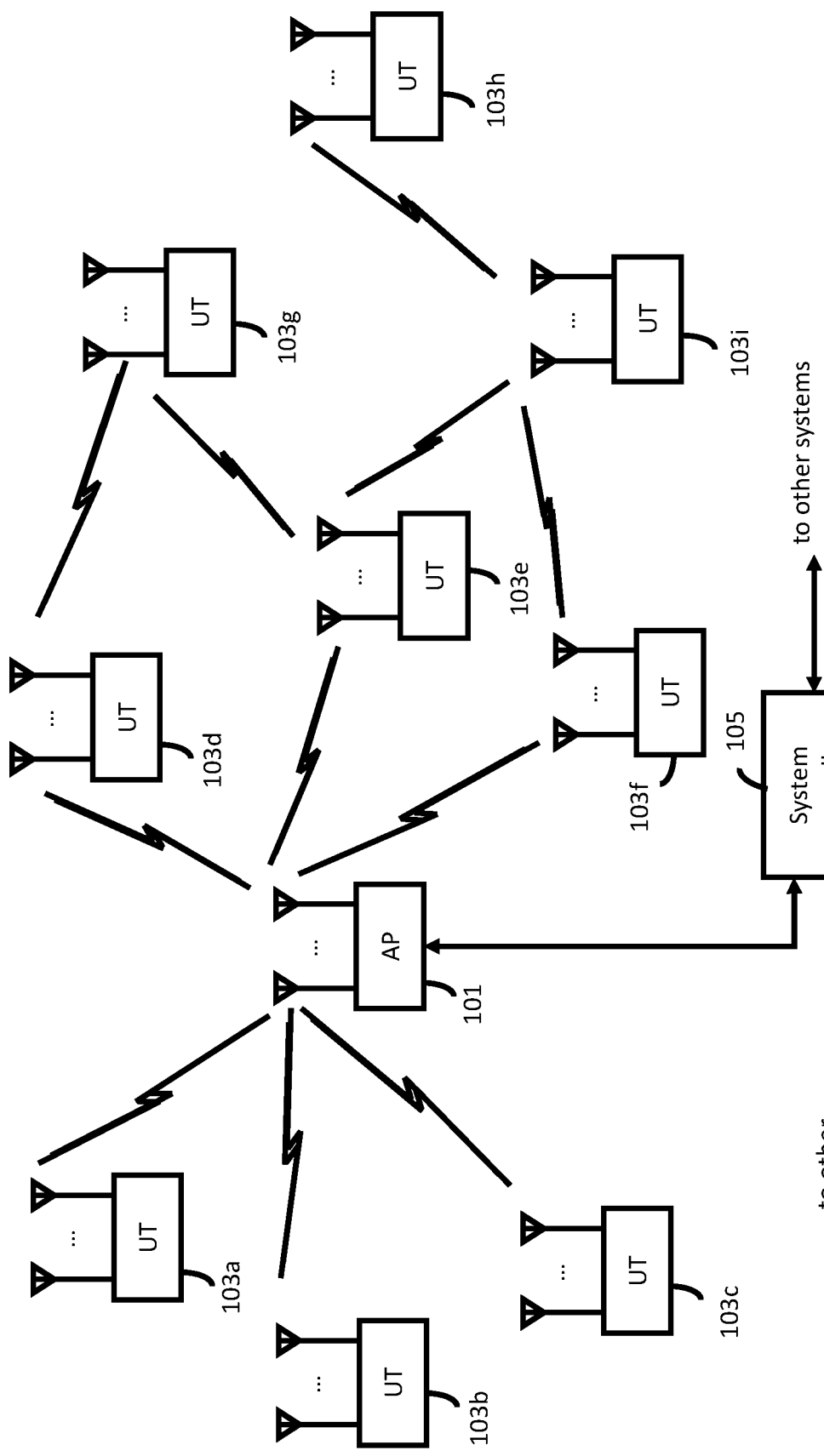
FIG. 1 is a schematic diagram illustrating a system comprising access points and user terminals in accordance with some embodiments of the present disclosure.

The preferred embodiments of the present disclosure have been disclosed in the description and examples. However the examples should not be construed as a limitation to the actual applicable scope of the disclosure, and as such, all modifications and alterations without departing from the spirits of the disclosure and appended claims shall remain within the protected scope and claims of the disclosure.

In accordance with various implementations, mechanisms (which can include methods, systems, and media) for frame aggregation and transmission are provided. Frame aggregation schemes can be used to increase throughput of a communication system by sending multiple data frames (e.g., packets) in a transmission. Multiple frames or sub-frames that are lost in the transmission may be aggregated in a next frame (e.g., a retransmitted frame) and retransmitted. However, the performance of conventional frame aggregation schemes may be significantly affected by channel conditions. For example, if the first sub-frame lost in a transmission is associated with a given sequence number (e.g., "$S_f$"), only sub-frames associated with particular sequence numbers (e.g., sequence numbers within a range of $[S_f, S_f+63]$) can be aggregated in the next aggregated frame for retransmission.

As such, the aggregation level of a retransmitted frame would fluctuate sharply due to various channel conditions that may cause the loss of sub-frames in various positions. This may directly reduce the transmission efficiency of the conventional frame aggregation schemes and may limit the throughput of a communication system utilizing convention frame aggregation schemes.

To address the above and other deficiencies of the conventional frame aggregation schemes, mechanisms for frame aggregation and transmission are provided. The mechanisms can perform frame aggregation and/or transmission utilizing an adaptive aggregation scheduling scheme. For example, the mechanisms can aggregate information and/or data into aggregated frames using various aggregation schemes, such as the Aggregate Media Access Control Protocol Data Unit (A-MPDU) aggregation scheme, the Aggregate Media Access Control Service Data Unit A-MSDU aggregation scheme, a two-level aggregation scheme, a biggest first stage aggregate size (BFAS) scheme, a maximum second stage aggregate level (MSAL) scheme, and/or any other aggregation schemes.

In some embodiments, the mechanisms can adaptively select and/or implement one or more frame aggregation schemes based on channel conditions. For example, the mechanisms can determine one or more metrics representative of a channel condition, such as one or more of a bit error rate, a bit error ratio, a bit error probability, a packet error ratio, a frame error rate, a signal-to-noise ratio, and/or any other metric that may measure one or more channel conditions. The mechanisms can then select a frame aggregation scheme based on the metric(s). For example, the mechanisms can compare the metric(s) with one or more thresholds and can make the selection based on the comparison. In some embodiments, the mechanisms may frame the information or data with position information into a sub-frame for indicating the position of sub-frame located in the aggregated frame. As such, the mechanisms can implement frame aggregation schemes adaptively based on the estimation of the channel conditions to compensate for the loss of the A-MPDU aggregate frame length if it dramatically declines.

FIG. 1 is a schematic diagram illustrating an example 100 of a communication system in accordance with some embodiments of the present disclosure. As shown, system 100 may include an access point 101, one or more user terminals 103a, 103b, 103c, 103d, 103f, 103g, 103h, and 103i, a system controller 105, and/or any other component for transmitting, receiving and/or processing data streams.

One or more components of system 100 may use one or more transmitting antennas and/or receiving antennas for data transmission on the downlink and/or uplink. In some embodiments, one or more transmitting antennas and receiving antennas may be integrated in one antenna. A downlink (e.g., a forward link) may be a communication link from the access point 101 to the user terminals 103. An uplink (e.g., a reverse link) may be a communication link from the user terminals 103 to the access point 101. System 100 may be a time division duplex system (TDD) or a frequency division duplex (FDD) system. For a TDD system, the downlink and the uplink may share the same frequency band. For a FDD system, the downlink and uplink may use different frequency bands. System 100 may also utilize a single carrier or multiple carriers for transmission.

Access point (AP) 101 may be a fixed station that communicates with the user terminals and may also be referred to as a base station or some other terminology. Access point 101 may communicate with one or more user terminals 103 at any given moment on downlink and/or uplink. Access point 110 may be equipped with a number $N_{ap}$ of antennas and represents the multiple-input (MI) for downlink transmissions and the multiple-output (MO) for uplink transmissions.

User terminals (UTs) 103a-i may be fixed or mobile and may also be referred to as a mobile station, a station (STA), a client, a wireless device, or some other terminology. Each of user terminals 103 may be a wireless device, such as a mobile phone, a personal digital assistant (PDA), a handheld device, a wireless modem, a laptop computer, a personal computer, a pad, or the like, or any combination thereof. Each of user terminals 103a-i may be configured to communicate with access point 101 at any given moment on the downlink and/or uplink. The user terminals 103a-i may also be configured to communicate peer-to-peer with another user terminal. A set $N_{ut}$ of selected user terminals 103*a-i* collectively represents the multiple-output for downlink transmissions and the multiple-input for uplink transmissions. Each of user terminals 103*a-i* may be equipped with a single antenna (e.g., in order to keep costs down) or multiple antennas (e.g., where the additional cost can be supported).

In some embodiments, system 100 may have $N_{ap} \geq N_{ut} \geq 1$ if the data symbol streams for the $N_{ut}$ user terminals are not multiplexed in code, frequency, or time by some means. $N_{ut}$ may be greater than $N_{ap}$ of the data symbol streams can be multiplexed using different code channels with CDMA, disjoint sets of sub-bands with OFDM, and so on. Each selected user terminal transmits user-specific data to and/or receives user-specific data from the access point. In general, each selected user terminal may be configured to be equipped with one or multiple antennas. The $N_{ut}$ selected user terminals can have the same or different number of antennas.

System controller 105 may be coupled to the access point 101 and provide control for the access point 101. System controller 105 may also be configured to provide coordination between access point 101 and any other access points and/or between system 100 and any other systems.

In some embodiments, each of access point 101, user terminals 103*a-i*, and system controller 105 may be and/or include a wireless device described in connection with FIG. 11 below. Each of access point 101, user terminals 103*a-i*, and system controller 105 can be implemented as a stand-alone device or integrated with other components of system 100.

Figure 2:
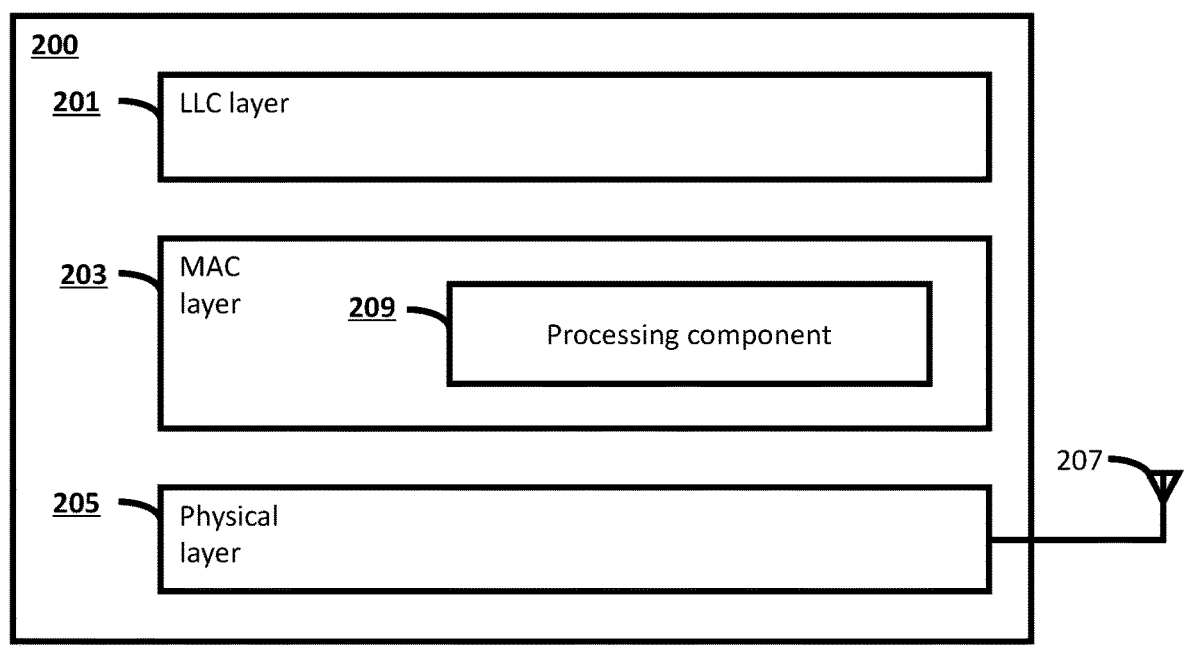
FIG. 2 is a schematic diagram illustrating an example of arrangement of a communication device in accordance with some embodiments of the present disclosure.

While a particular number of access points and user terminals are shown in FIG. 1, this is merely illustrative. System 100 can include any suitable number of access points, user terminals, system controllers, and/or any other component FIG. 2 is a schematic diagram illustrating an example 200 of a communication device in accordance with some embodiments of the present disclosure. For example, a communication device 200 may be an access point 101, a user terminal 103, and/or any other component of FIG. 1. The communication device 200 may be configured to communicate with one or more other communication devices through any communication medium (e.g., one or more radio links, network links, dial-up links, wireless links, Bluetooth® links, hard-wired links, and any other suitable communication links, or a combination of such links).

As shown, the communication device 200 may include a processor 201 implementing a logic link control ("LLC") layer, a processor 203 implementing a Media Access Control ("MAC") layer, a processor 205 implementing a physical layer (also referred to herein as the "PHY layer"), one or more antennas 207, and/or any other component for receiving, processing, and/or transmitting data streams.

Each of processors 201, 203, and 205 may be implemented as analog or digital electronic circuits in accordance with implementation requirements. Alternatively or additionally, each of processors 201, 203, and 205 may be implemented as firmware or the like to be executed by a CPU incorporated in a Large-Scale Integration (LSI). In some embodiments, each of processors 201, 203, and 205 and antennas 207 may be and/or include any of a general purpose device, such as a computer or a special purpose device such as a client, a server, etc. Any of these general or special purpose devices can include any suitable components such as a hardware processor (which can be a microprocessor, digital signal processor, a controller, etc.), memory, communication interfaces, display controllers, input devices, a storage device (which can include a hard drive, a digital video recorder, a solid state storage device, a removable storage device, or any other suitable storage device), etc.

In some embodiments, each of processors 201, 203, and 205, and antennas 207 can be implemented as a stand-alone device or integrated with other components of communication device 200.

The processor 201 may implement an LLC layer and may provide multiplexing mechanisms to implement one or more networking protocols (e.g., the Internet Protocol (IP), the Internetwork Packet Exchange (IPX) protocol, DECnet protocol, Apple Talk protocol, etc.) in a multipoint network and to cause the network protocols to be transported over the same network medium. The processor 201 may also provide flow control and automatic repeat request (ARQ) error management mechanisms.

The processor 203 may implement an MAC layer. The processor 203 may include one or more processing components 209 for MAC frames according to the present disclosure. The MAC layer may act as an interface between the LLC layer and the PHY layer. The process unit 203 may emulate a full-duplex logical communication channel, which may provide unicast, multicast, broadcast, and/or any other type of communication service, in a multi-point network or in a point-to-point network.

The processing component 209 may be configured to generate a PHY frame containing one or more MAC frames. The PHY frame may be and/or include one or more Physical Layer Convergence Protocol service data units (also referred to as "PSDUs"). Each of the MAC frames may be and/or include MAC protocol data units (also referred to as "MPDUs"). In some embodiments, the processing component 209 may be and/or include one or more processing components 209 and/or one or more portions of processing component 300 as described in conjunction with FIG. 3 below.

The processor 205 may implement the PHY layer. For example, the processor 205 may be configured to process a PHY frame generated by the process unit 203 and/or to transmit the PHY frame through antenna 207. In this specification, such a communication scheme will be referred to as "frame aggregation." Frame aggregation is suitable for the next-aggregation high-throughput wireless LAN communication which is currently being developed.

In some embodiments of the present disclosure, the processing component 209 may be configured to aggregate multiple MAC frames addressed to different destinations to implement a frame aggregation scheduling scheme. For example, the processing component 209 can execute one or more portions of processes 600-1000 of FIGS. 6-10.

Figure 3:
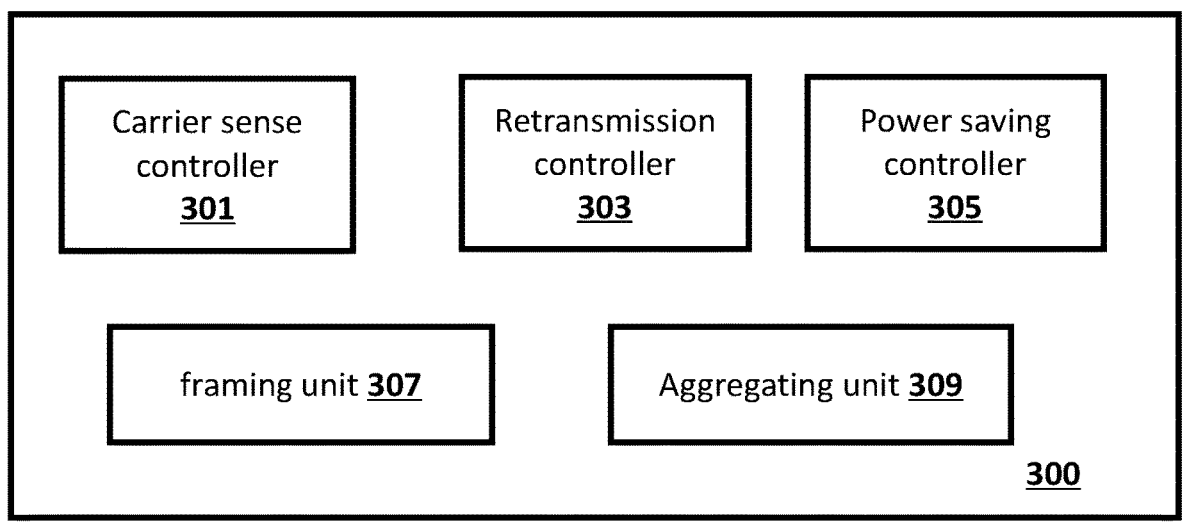
FIG. 3 is a schematic diagram illustrating an example of a processing component shown in FIG. 2 in accordance with some embodiments of the disclosed subject matter.

FIG. 3 is a schematic diagram illustrating an example 300 of a processing component for implementing a frame aggregation scheme in accordance with some embodiments of the disclosed subject matter. In some embodiments, processing component 300 may be and/or include the processing component 209 shown in FIG. 2.

As illustrated, processing component 300 may include a carrier sense controller 301, a retransmission controller 303, a power saving controller 305, a framing unit 307, an aggregation unit 309, and/or any other component for implement frame aggregation and/or transmission.

Carrier sense controller 301 may be configured to use a carrier sensing scheme in which a communication device may detect other signals while transmitting a frame. The carrier sense controller 301 may set one or more parameters for disabling transmission and waiting for a random time interval before trying to resend frame (e.g., NAV (Network Allocation Vector)).

Retransmission controller 303 may be configured to determine whether one or more frames are to be retransmitted and to identify a frame to be included in a MAC aggregation-frame based on such determination. The communication device may make the determination based on an acknowledgement (ACK) message received from another communication device to which the frames are transmitted. The communication device that transmits the MPDUs is referred to herein as the "sender." The communication device to which the MPDUs are transmitted is referred to herein as the "receiver." The ACK message may be and/or include, for example, an ACK frame that acknowledges receipt of one MAC frame, a Block ACK that acknowledges receipt of multiple MAC frames, and/or any other acknowledge message that acknowledges receipt of one or more frames.

Power saving controller 305 may be configured to control the communication device to switch to a power saving state when the communication device recognize any of frames (e.g., a single frame and/or a super-frame) and determine that it is unnecessary to carry out reception or transmission over a duration. In some embodiments, power saving can be achieved by stopping an unnecessary circuit upon recognizing the power saving state. A circuit may be stopped or restarted at a particular time. For example, the power saving state may be terminated at a NAV end time point.

Framing unit 307 may be configured to gather frame information and aggregate the information into a frame structure which may be used to transmit in one or more channel. The frame information may include, for example, the data which should be transmitted, frame header that includes some parameters of the frame (e.g., destination address, source address, duration, length, delimiters, protocols, position information), FCS that may be used to store CRC (Cyclical Redundancy Check), or any other information for transmission. In some embodiments, frame unit 307 may insert the frame header in the front of the data information and insert the FCS in the rear of the data information.

Figure 4A:
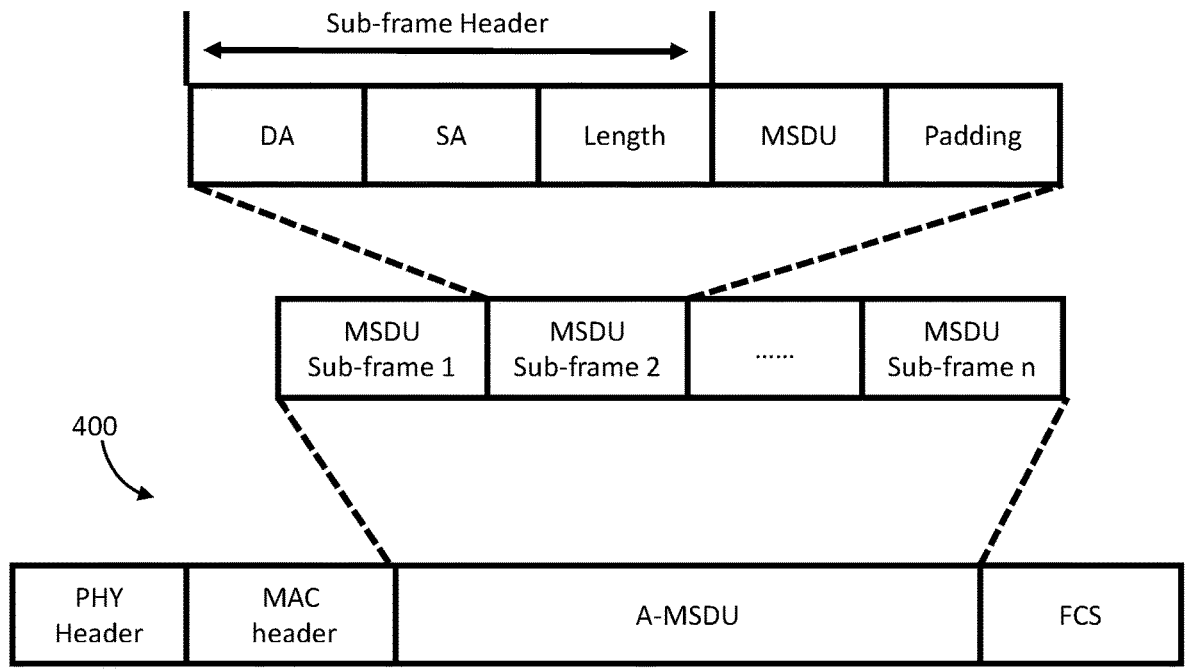
FIG. 4A illustrates an exemplary aggregation scheme of A-MSDU in accordance with some embodiments of the disclosed subject matter.
Figure 4B:
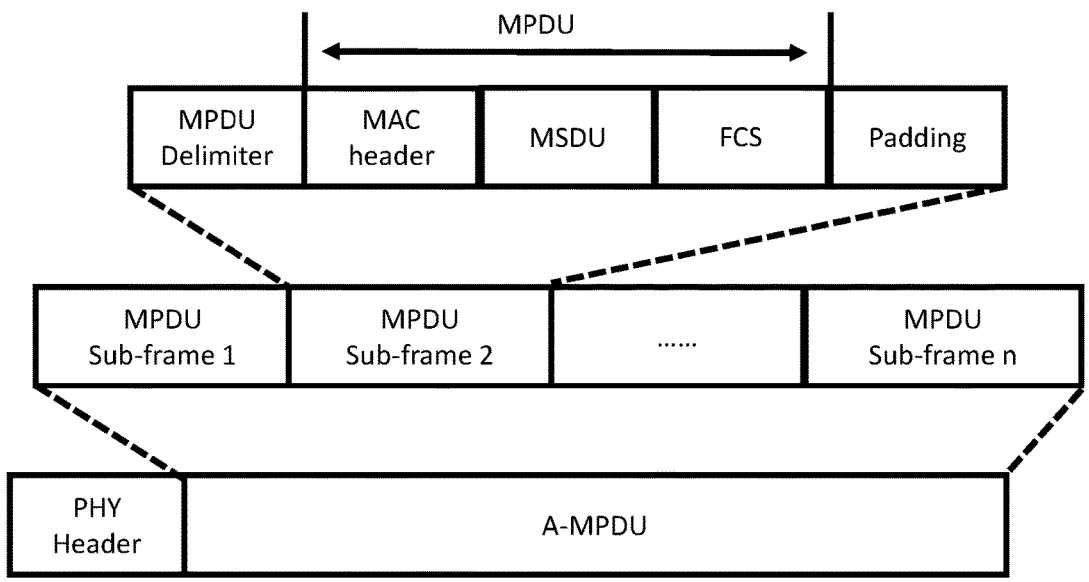
FIG. 4B illustrates another exemplary aggregation scheme of A-MPDU in accordance with some embodiments of the disclosed subject matter.
Figure 4C:
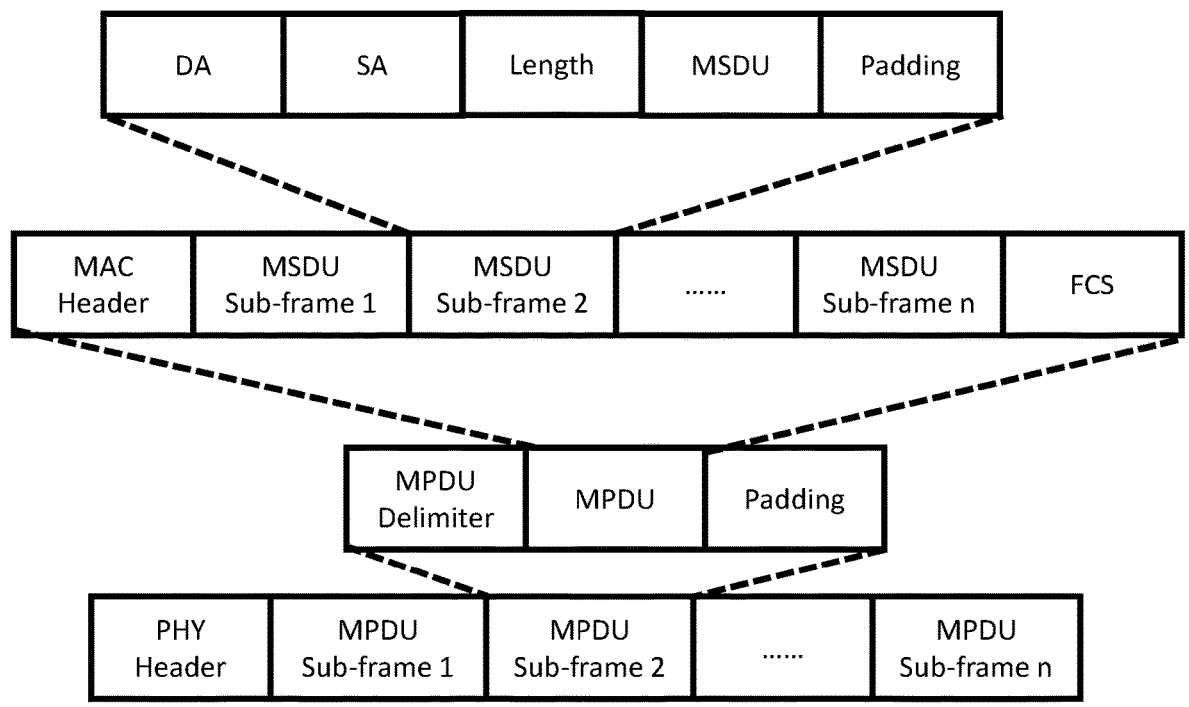
FIG. 4C illustrates an exemplary two-level aggregation scheme of A-MPDU in accordance with some embodiments of the disclosed subject matter.

Aggregation unit 309 may be configured to aggregate two or more frames into a single transmission frame and/or da super-frame. For example, the aggregation unit 309 may implement one aggregation level by aggregating two or more MSDUs (MAC Service Data Unit) to one A-MSDU (MAC Protocol Data Unit) as shown in FIG. 4A or by aggregating one or more MPDUs to one A-MPDUs as shown in FIG. 4B. The aggregation unit 309 may also implement two aggregation level, for example, aggregating two or more MSDUs to one MPDU and then aggregating two or more MPDUs to one A-MPDU as shown in FIG. 4C. In some embodiments, the aggregation unit 309 may be configured to implement more aggregation levels.

FIG. 4A illustrates an example 400 of an aggregation scheme of A-MSDU in accordance with some embodiments of the disclosed subject matter. As illustrated, an A-MSDU may include one or more MSDU sub-frames. Each MSDU sub-frame may include one or more data fields, such as a "DA" (destination address) field, an "SA" (source address) field, a "length" field, an "MSDU" field, a "padding" field, and/or any other field for storing information about the sub-frame. In some embodiments, multiple fields of the sub-frame may or may have the same size. For example, different fields of the sub-frame may have variable sizes.

In some embodiments, a PHY header, a MAC header, a frame check sequence (FCS) field, and/or any other data field may be assembled with the A-MSDU. Each of the PHY header, the MAC header, and the FCS field may be added to any suitable portion of the A-MSDU, such as the front section, the lower section of the A-MSDU frame, etc. In some embodiments, one or more of the PHY header, the MAC header, and the FCS field may be added to the A-MSDU when the A-MSDU has been propagated to the PHY layer.

In some embodiments, the size of one A-MSDU frame may be determined based on an aggregating threshold, waiting time of frames, a channel condition, the number of frames, and/or any other parameter that may affect transmission of the A-MSDU frame. In some embodiments, the aggregating threshold may be set based on a throughput of the communication device (e.g., a maximum throughput, a peak measured throughput, a maximum sustained throughput, and/or any other parameter indicative of the rate of successful message delivery by the communication device). For example, the aggregation threshold may be set as 3839 bytes when the communication device may be an ordinary station and the aggregation threshold may be set as 7935 bytes when the communication device may have HT (High Throughput) capacity. In some embodiments, the communication device may stop aggregating new sub-frames when size of A-MSDU reach the aggregating threshold or when waiting time for aggregating is larger than the predetermined time (e.g., 1us).

FIG. 4B illustrates an example aggregation scheme of A-MPDU in accordance with another embodiment of the disclosed subject matter. As illustrated, an A-MPDU may include one or more MPDU sub-frames. Each MPDU sub-frame may include one or more data fields, such as MPDU Delimiter, MAC header, MSDU, FCS, Padding and/or any other field used for transmission, which may have variable sizes. In some embodiments, a PHY header may be inserted in the front of an A-MPDU while one or more MPDU sub-frame may be aggregated into an A-MPDU frame. In some embodiments, the communication device may need to retransmit the lost MPDU sub-frames when one or more MPDU sub-frames lost in the transmission using said aggregation scheme.

In some embodiments, the number of MPDU in the A-MPDU may be determined based on the number of MPDUs which are waiting for transmission (e.g., the number of MPDUs in a queue of MPDUs to be transmitted). In another embodiment, the maximum number of MPDU in the A-MPDU may be set as 64 when the BlockACK (Block Acknowledgement) scheme is used to acknowledge whether the transmission is successful. In some embodiments, the maximum size of A-MPDU may be determined based on the throughput of communication device. For example, the maximum size of A-MPDU may be 8191 bytes, 16383 bytes, 32767 bytes, 65535 bytes and/or any other size in response to throughput of communication device.

FIG. 4C illustrates an example of a two-level aggregation scheme of A-MPDU in accordance with some embodiments of the disclosed subject matter. As illustrated, the two-level aggregation scheme may be implemented by aggregating one or more MSDUs to one A-MSDU (also referred to as one MPDU). One or more A-MSDUs can then be aggregated to one A-MPDU. In some embodiments, a MPDU sub-frame may include one or more fields for storing information about the MPDU sub-frame, such as MPDU Delimiter, MPDU, Padding and/or any other field for storing data that can be used for frame aggregation and/or transmission. Additionally, the MPDU may include one or more data fields for storing information about the MPDU, such as a MAC header, one or more MSDU sub-frames, an FCS field, and/or any other suitable field for storing data for frame aggregation and/or transmission. In some embodiments, a PHY header may be inserted at the beginning of an A-MPDU. In some embodiments, the communication device may retransmit one or more MPDU sub-frames that were lost during the transmission when one or more MSDU sub-frames in the MPDU lost in the transmission using the aggregation scheme.

In some embodiments, a MAC header may include one or more fields for storing data about the MPDU frame and/or one or more sub-frames. For example, a MAC header may include one or more of a "frame control" field, a "duration" field, a "destination address" field, a "source address" field, a "sequence control" field, a "QOS control" field, a "HT (High throughput) control" field, a "position information" field, and/or any other field for storing data about the sub-frame. In some embodiments, the "position information" field may be included in the "HT control" field. In some embodiments, different fields in the MAC header may have variable sizes. For example, the size of the "duration" field may be 2 bits while the size of the "destination" or "source address" field may be 6 bits. In some embodiments, the size of the "position information" field may have 6 bits or any other suitable size. In some embodiments, multiple fields in the MAC header may have the same size.

In some embodiments, the "sequence control" field may include one or more fields, such as a "sequence number" field, a "fragment number" field, and/or any other field for storing data that can be used for frame aggregation and/or transmission. The "sequence number" field may have a fixed length (e.g., 12-bit or any other suitable length). The sequence number field may store information indicative of the sequence number of an MSDU, A-MSDU, or MPDU. Each MSDU, A-MSDU, or MPDU transmitted by a communication device can be associated with a sequence number. In some embodiments, the sequence number field may include information about one or more sub-frames to be retransmitted (e.g., sequence numbers) and may be used to control the aggregation of the A-MPDU. For example, when one or more sub-frames in a current A-MPDU are lost during transmission, the lost sub-frames may be first aggregated in the next A-MPDU (e.g., a retransmitted A-MPDU) followed by one or more new sub-frames to be transmitted (e.g., one or more sub-frames in a queue of sub-frames to be aggregated and/or transmitted). In the retransmitted A-MPDU, the sequence number of the last aggregated sub-frame (denoted by $S_l$) must be no more than $S_f+63$, where $S_f$ is the sequence number of the first lost sub-frame, as well as the starting sequence number of the current retransmitted A-MPDU. For example, when the first sub-frame in an A-MPDU is lost, only the lost sub-frame will be allowed to be aggregated in the retransmitted A-MPDU, and no new sub-frame is allowed to be aggregated into it.

In some embodiments, the "position information" field may include data about positional information of the MPDU sub-frame in the A-MPDU frame. For example, the "position information" field can include one or more parameters that indicate the order of the MPDU sub-frame when it is aggregated in the A-MPDU frame.

For example, upon receiving the A-MPDU frame including a "position information" field, the receiver can generate a BlockACK message (e.g., a BlockACK frame) including information about receipt of one or more sub-frames of the A-MPDU frame. More particularly, for example, the receiver may generate a bitmap and assemble a BlockACK frame using the bitmap. Each bit in the bitmap may correspond to a sub-frame in the A-MPDU frame. The value of a given bit in the bitmap may indicate whether a sub-frame corresponding to the given bit has been received by the receiver or lost during transmission. In some embodiments, in response to determining that a sub-frame has been successfully received, the receiver may fill an identifier in a position of the bitmap corresponding to the sub-frame to indicate successful receipt of the sub-frame. The identifier may be any value that can indicate successfully receipt of the sub-frame, such as "0," "1," etc. In some embodiments, in response to determining that a sub-frame has not been successfully received and/or has been lost, the receiver may fill an identifier (e.g., "0," "1," etc.) in the position of the bitmap to indicate unsuccessful receipt of the sub-frame. In some embodiments, using positional information to acknowledge the received status may allow that the retransmitted A-MPDU to have the maximum aggregation size. For example, when the first sub-frame in an A-MPDU is lost, the lost sub-frame may be allowed to be aggregated in the retransmitted A-MPDU with new sub-frames.

In some embodiments, the two-level aggregation scheme may comprise different aggregation strategies, such as the BFAS (Biggest First Aggregate Size) strategy, MSAL (Maximum Second Stage Aggregate Level) strategy, and/or any other strategy for aggregating the sub-frame. More particularly, the BFAS strategy may perform the first stage frame aggregation using the maximum frame length of the A-MSDU. The MSAL may decrease the first stage aggregation frame length of A-MSDU to ensure that the RAL (retransmission aggregation level) of the second stage aggregation is equal to the maximum retransmission aggregation level.

Figure 5:
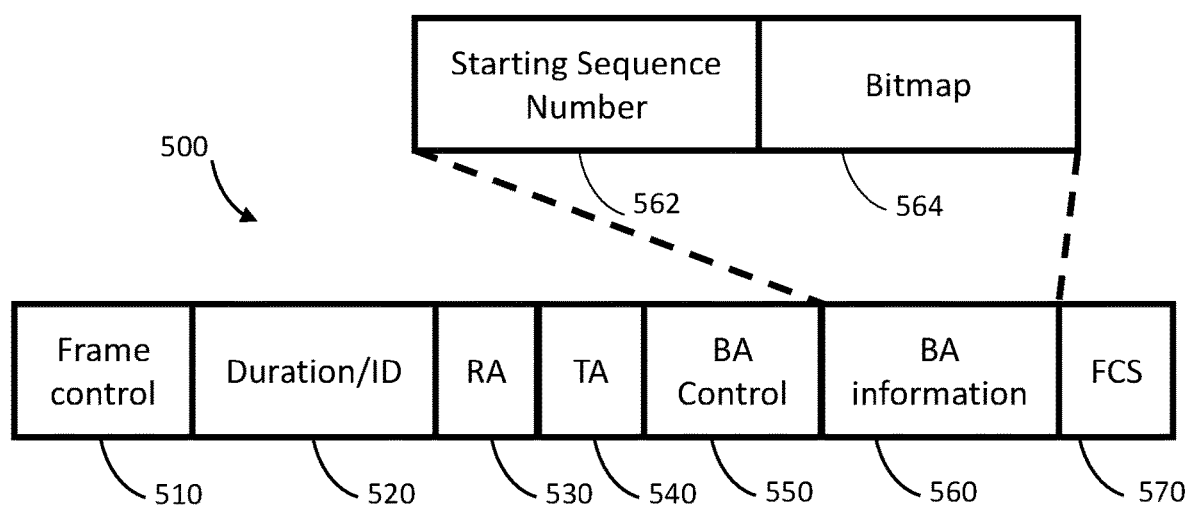
FIG. 5 is a structure illustrating an example of an acknowledgement frame in accordance with some embodiments of the disclosed subject matter.

FIG. 5 is a diagram illustrating an example 500 of an acknowledgement (ACK) frame in accordance with some embodiments of the disclosed subject matter. In some embodiments, ACK frame 500 can be a block ACK that acknowledges receipts of multiple MPDUs. Alternatively or additionally, ACK frame 500 can be and/or include an ACK message that acknowledges receipt of an individual MPDU.

As illustrated, ACK frame 500 can include one or more data fields, such as a "frame control" field 510, a "duration/ID" field 520, a "receiving address" (RA) field 530, a "transmitter address" (TA) field 540, a "block ACK (BA) control" field 550, a "block ACK (BA) information" field 560, a "frame check sequence (FCS)" field 570, and/or any other suitable field for storing information that can be used for frame aggregation and/or transmission.

In some embodiments, BA information field 560 may include a "starting sequence number" field 562, a "bitmap" field 564, and/or any other suitable field for storing information about transmission of one or more MPDU frames and/or sub-frames. One or more fields may be omitted from BA information field 560. For example, BA information field 560 may include "bitmap" filed 564 and/or any other suitable field without filed 562. Alternatively or additionally, one or more fields in BA information field 560 and/or ACK frame 500 may be integrated with one or more other fields.

In some embodiments, "starting sequence number" field 562 may include identifying information about the first acknowledged sub-frame in the received A-MSDU and/or A-MPDU frames (e.g., the first sub-frame that has been successfully received by the receiver). For example, the identifying information may include a sequence number of the first acknowledged sub-frame and/or any other information that may be used to identify the first acknowledged sub-frame. The starting sequence number of a retransmitted A-MSDU or A-MPDU may be the sequence number of the first lost sub-frame (e.g., denoted as $S_f$). In some embodiments, the starting sequence number may be used to determine the number of sub-frames to be aggregated in the next MPDU-frame (e.g., a retransmitted frame). For example, the sequence number of the last aggregated sub-frame of the A-MPDU or A-MSDU may be no more than a combination of the sequence number and an offset (e.g., "$S_f+63$").

In some embodiments, the bitmap may be used to acknowledge the sub-frames in A-MPDU respectively and each bit in the bitmap may correspond to a sub-frame in the A-MPDU frame. The value of a bit in the bitmap may indicate whether the sub-frame corresponding to the bit has been received at the receiver. For example, a bit "0" may indicate successful receipt of the corresponding sub-frame while a bit "1" may indicate that the corresponding sub-frame was not successfully received and/or was lost. As another example, a bit "1" may indicate successful receipt of the corresponding sub-frame while a bit "0" may indicate that the corresponding sub-frame was not successfully received and/or was lost.

Figure 6:
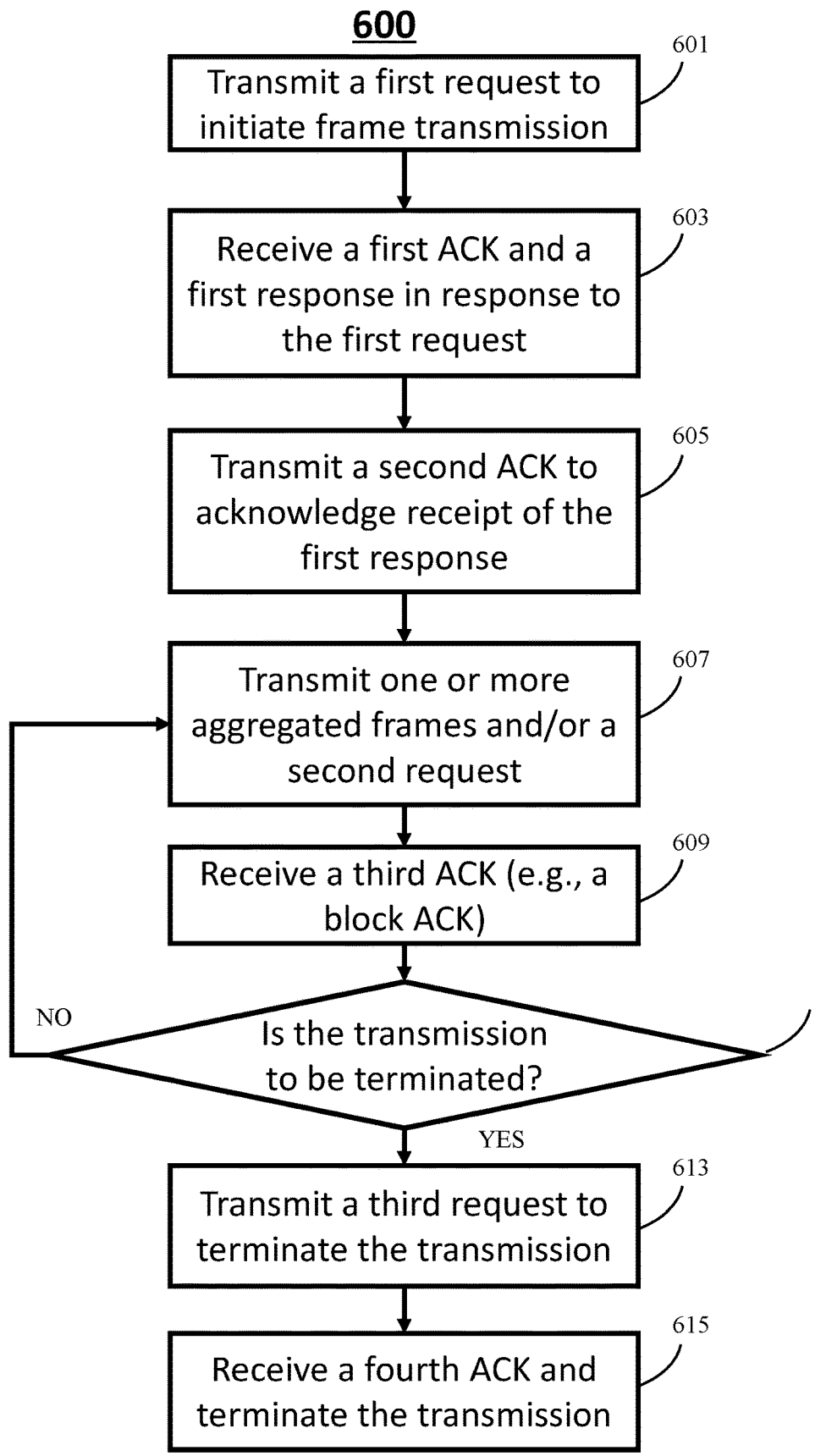
FIG. 6 is a flow chart illustrating an example process for transmission of aggregated frames in accordance with one embodiment of the disclosed subject matter.

FIG. 6 is a flow chart illustrating an example 600 of a process for frame transmission in accordance with some embodiments of the disclosed subject matter. In some embodiments, process 600 may be executed by one or more communication devices, such as one or more APs, user terminals, stations, and/or any other device as described above in connection with FIGS. 1-3.

As illustrated, process 600 can begin by a sender device sending, to a receiver device, a first request to initiate frame transmission at block 601. In some embodiments, the first request may be and/or include an ADDBA (Add BlockACK) request.

At 603, the sender device may receive, from the receiver device, a first response that is generated responsive to the first request. The first response may include a first ACK frame that is generated in response to the first request. For example, the ACK frame may include information that acknowledges the receipt of the first request. As another example, the response signal may be an ADDBA response, which may be used to start the aggregation transmission.

At 605, the sender device may transmit, to the receiver device, a second ACK frame to acknowledge receipt of the first response. The sender device may also start the aggregation transmission in response to receiving the first response in some embodiments.

At 607, the sender device may transmit one or more aggregated frames to the receiver device. Additionally, the sender device may transmit a second request for an acknowledgement message to the receiver device. The aggregated frames and the second request may be transmitted in one or more messages. In some embodiments, the aggregated frame may be aggregated with one or more MSDUs or MPDUs using one or more aggregation schemes as described in connection with FIGS. 4A-4C. In some embodiments, the second request may be a BlockACK request, which may be used to request a BlockACK from the receiver device.

At 609, the communication device may receive a third ACK message from the receiver device. In some embodiments, the third ACK message may include information that acknowledges receipt of one or more sub-frames in the aggregated frame by the receiver device. In some embodiments, the third ACK message may be and/or include a block ACK as described in connection with FIG. 5.

At 611, the sender device may determine whether the transmission is to be terminated or not. For example, the sender device may determine that the transmission is not to be terminated in response to determining that one or more frames (e.g., retransmitted frames, new frames in a MAC queue, etc.) are to be transmitted to the receiver device. Alternatively, the sender device may determine that the transmission is to be terminated in response to determining that no frame is to be transmitted to the receiver device.

In some embodiments, the sender device may proceed to 613 in response to determining that the transmission is to be terminated. In some embodiments, the sender device may terminate the transmission on its own initiative.

Alternatively, the communication device may loop back to 607 and may transmit a next aggregated frame and/or a next request for ACK message in response to determining that the transmission is not to be terminated.

At 613, the sender device may transmit, to the receiver device, a third request to terminate the transmission. In some embodiments, the third request may be and/or include a DELBA (Delate BlockACK) request signal.

At 615, the sender device may receive a fourth ACK message from the receiver device. The sender device may then terminate the transmission. In some embodiments, the fourth ACK message may include information that acknowledges receipt of the third request by the receiver device.

In some embodiments, the communication device may wait for an ACK that acknowledges receipt of the second request by the receiver device. In response to receiving the ACK, the sender device may receive the BlockACK from another communication device and then transmit an ACK to another communication device for acknowledging the receipt of the BlockACK. Then, the communication device may transmit aggregated frames iteratively until the sender device determines that the transmission is to be terminated.

Figure 7:
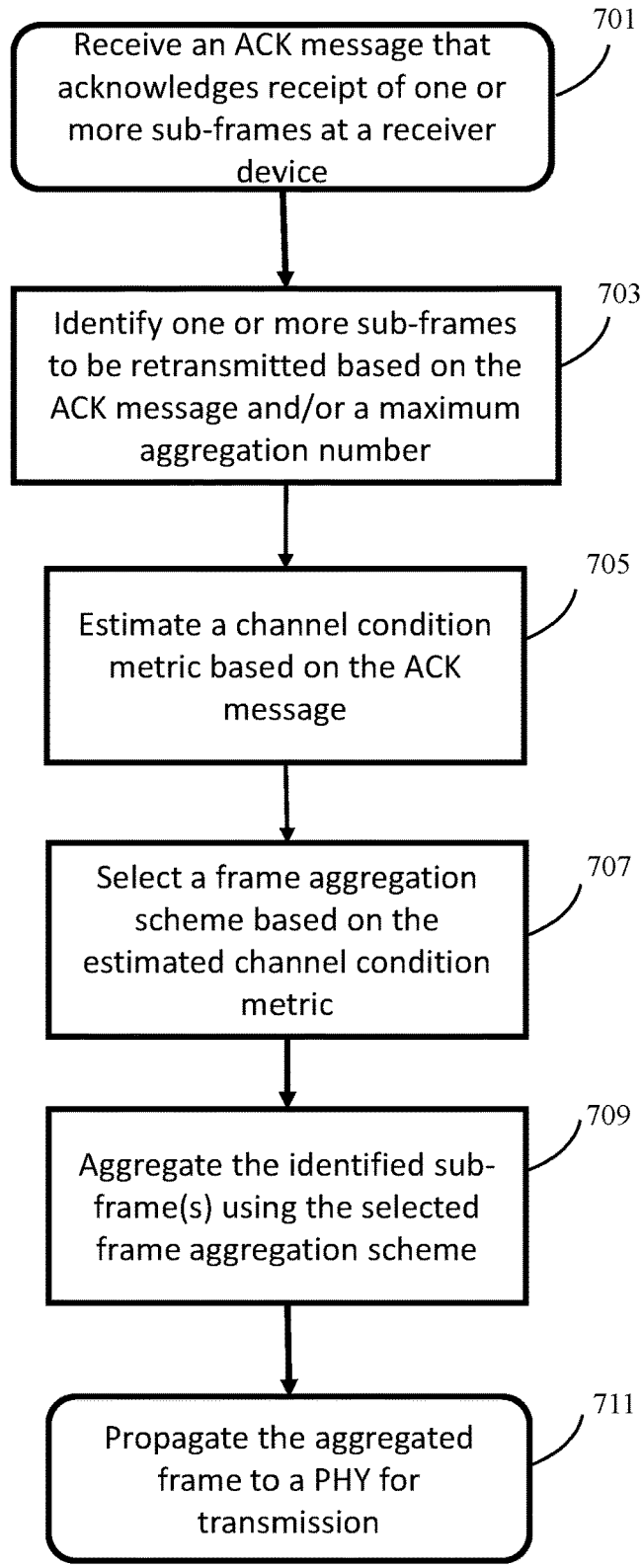
FIG. 7 is a flow chart illustrating an example of a process for transmitting an aggregated frame according to some embodiments of the disclosed subject matter.

FIG. 7 is a flow chart illustrating an example 700 of a process for frame aggregation and transmission according to some embodiments of the disclosed subject matter. In some embodiments, process 700 can be executed using one or more hardware processors of a communication device as described above in connection with FIGS. 1-3.

As shown, process 700 can begin by a communication device receiving an ACK message that acknowledges receipt of one or more sub-frames at a receiver device at block 701. In some embodiments, the ACK message may be a Block-Ack that acknowledges receipt of multiple sub-frames. For example, the ACK message may be and/or include a Block-Ack as described in connection with FIG. 5 above. The ACK message may be transmitted through any suitable channel (e.g., a wireless channel, a wired channel, a Rayleigh fading channel, a Rice fading channel, a Gaussian channel, etc.).

At 703, the communication device can identify one or more sub-frames to be retransmitted based on the ACK message and/or a maximum aggregation number. For example, the sub-frame(s) can be identified based on a bit map in the ACK message that includes information about whether each the transmitted sub-frames has been received by the receiver device. More particularly, for example, the sender device may determine that a sub-frame is to be retransmitted in response to determining that a bit in the bitmap corresponds to the sub-frame is "0." In some embodiments, the corresponding bit in the bitmap may be selected based on one or more fields included in the sub-frame, for example, sequence number.

The sub-frame(s) may also be identified based on the maximum aggregation number. In some embodiments, sequence number of the last aggregated sub-frame may be no more than $S_f+63$, where $S_f$ is the sequence number of the first lost sub-frame. For example, the sequence number of the last aggregated sub-frame may be 72 when $10^{th}$ sub-frame in the aggregated frame is lost. In some embodiments, the maximum aggregation number may be decided based on some parameters, for example, the sequence number of the last aggregated sub-frame, capacity of the communication device, the current frame to be transmitted, and/or any other parameters affective for aggregation.

At 705, the communication device can estimate a channel condition metric based on the ACK message. For example, the communication device may estimate Bit Error Rate (BER) of the current transmission in accordance with the measured SNR of the BlockACK. As another example, the communication device may estimate the channel condition and change trend of channel condition in accordance with bit values in the bitmap included in the BlockACK. For example, the communication device may decide that the channel condition may become better in case that number of bit "1" in first half part of the bitmap is smaller than second, or in case that number of bit "0" in the current received bitmap is smaller than the pre-received bitmap. For another example, the communication device may decide that the channel condition may become worse in case that number of bit "0" in first half part of the bitmap is smaller than second half part, or in case that number of bit "1" in the current received bitmap is smaller than the pre-received bitmap.

At 707, the communication device can select an aggregation scheme based on the channel condition metric. For example, an adaptive two-level frame aggregation scheme may be selected based on the estimated BER in accordance with the measured SNR of the BlockACK. More particularly, if the estimated BER is smaller than a threshold, an aggregation scheme which may provide higher throughput may be selected. In some embodiments, the communication device may only implement A-MPDU aggregation scheme or A-MSDU aggregation scheme.

In some embodiments, an aggregation scheme which may provide variable throughput capacities may be selected based on the estimated change trend of channel condition. For example, an aggregation scheme with higher throughput capacity, for example, BFSA aggregation scheme, may be selected in case that the channel condition become better. In some embodiments, the sender device may select the aggregation scheme as described in the FIGS. 4A-4C adaptively.

At 709, the communication device can aggregate subframes using the selected aggregation scheme. For example, the communication device may aggregate A-MSDU to its maximum size and reduce the aggregated number of the MPDU in the A-MPDU.

At 711, the communication device can propagate the aggregated frame into PHY layer for transmission.

Figure 8:
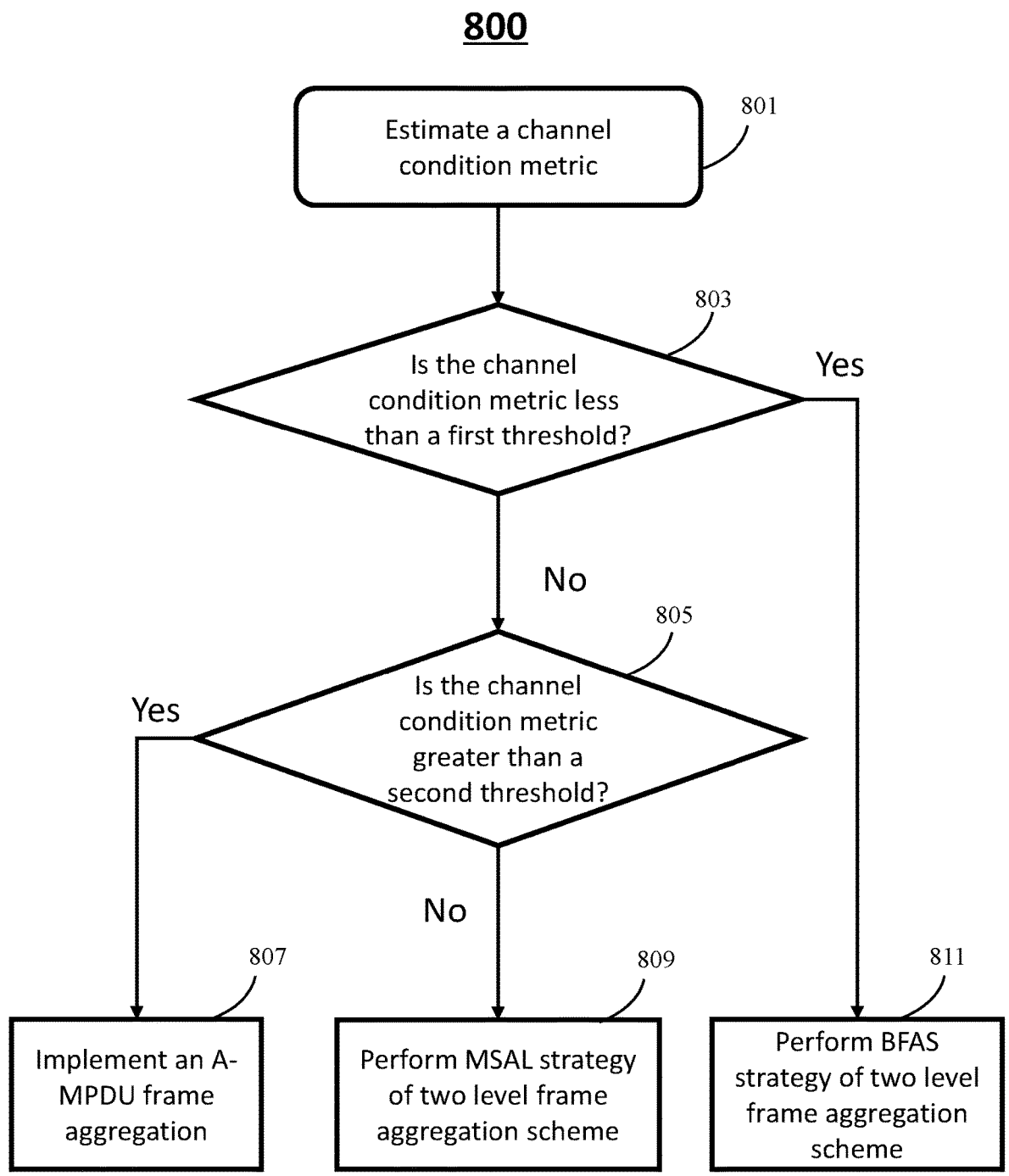
FIG. 8 shows a flow chart illustrating an example of a process for selecting an aggregation scheme according to an embodiment of the disclosed subject matter.

FIG. 8 shows a flow chart illustrating an example 800 of a process for implementing a frame aggregation scheme according to an embodiment of the disclosed subject matter. In some embodiments, process 800 can be executed by one or more hardware processors implementing a communication device above in connection with FIGS. 1-5.

As illustrated, process 800 can begin by the communication device estimating a channel condition metric. The channel condition metric may be and/or include a bit error rate (BER), a bit error ratio, a bit error probability, a packet error ratio, a frame error rate, a signal-to-noise ratio, and/or any other metric that may measure one or more channel conditions. In some embodiments, the channel condition metric may be determined by performing one or more operations as described in connection with 705 of FIG. 7 above.

At 803, the communication device may compare the channel condition metric with a first threshold of channel condition metric and may determine whether the channel condition metric is less than the first threshold based on the comparison. The first threshold may be determined beforehand based on various techniques, such as theoretical analysis, prior learning, etc. In some embodiments, the communication device can determine that the channel condition metric is less than the first threshold in response to determining that a difference between the channel condition metric and the first threshold (e.g., an absolute difference, a square difference, etc.) is not greater than a predetermined value.

In some embodiments, the communication device may proceed to 811 in response to determining that the condition metric is less than the first threshold. Alternatively, in response to determining that the channel condition metric is equal to or greater than the first threshold, the communication device may proceed to 805.

At 805, the communication device may compare the channel condition metric with a second threshold of channel condition metric. The second threshold may be determined beforehand using various techniques, such as theoretical analysis, prior learning, etc. The second threshold may be greater than the first threshold in some embodiments. The communication device can determine that the channel condition metric is less than the second threshold in response to determining that a difference between the channel condition metric and the second threshold (e.g., an absolute difference, a square difference, etc.) is not greater than a predetermined value.

In some embodiments, the communication device may proceed to 809 in response to determining that the channel condition metric is less than the second threshold. Alternatively, the communication device may proceed to 807 in response to determining that the channel condition metric is equal to or greater than the second threshold.

At 807, the communication device may perform frame aggregation based on an A-MPDU frame aggregation scheme. For example, the communication device can identify one or more MSDUs to be transmitted and can assemble each of the MSDUs with a MAC header and a FCS field to form a sub-MPDU. In some embodiments, the frame aggregation may be performed based on the A-MPDU frame aggregation scheme described in connection with FIG. 4B.

At 809, the communication device may perform frame aggregation based on a MSAL strategy of two level frame aggregation scheme. For example, the MSAL strategy of two level frame aggregation may decrease the first stage aggregation frame length of A-MSDU until the RAL of the second stage aggregation is equal to the MRAL. In some embodiments, the MSAL strategy of two level frame aggregation may be implemented based on the equation $$L_{AMSDU} = \begin{cases} \lfloor L_{AMSDU,max}/L_{subf} \rfloor * L_{subf}, & \text{if } L_{AMSDU,max}/L_{ral,max} > L_{AMSDU,max} \\ \lfloor L_{AMPDU,max}/(L_{ral,max} \times L_{subf}) \rfloor \cdot L_{subf}, & \text{else} \end{cases}, \quad (1)$$

where $L_{AMSDU}$ and $L_{AMPDU}$ may be the sizes of the A-MSDU and A-MPDU, respectively; $L_{subf}$ is the size of the sub-frame; $L_{ral,max}$ may be the maximum retransmission aggregation level. In some embodiments, the maximum retransmission aggregation level may be 64 or any other suitable value. The maximum retransmission aggregation level may be determined as follows:

$$l_{ral} = \begin{cases} n + (S_f - S_s), & \text{if } n \neq 0 \\ l_{ral,max}, & \text{else} \end{cases}, \quad (2)$$

where $S_f$ is the sequence number of the first lost sub-frame in A-MPDU aggregate frame; $S_s$ is the start sequence number of the first aggregated sub-frame in the A-MPDU aggregate frame; and n is the number of lost sub-frames. $L_{AMSDU,max}$ and $L_{AMPDU,max}$ may be the maximum aggregated frame length of A-MSDU and A-MPDU. For example, in IEEE 802.11n standard, $L_{AMPDU,max}$ is 65535 bytes and $L_{AMSDU,max}$ is 4095 bytes for implementations of the two-level frame aggregation scheme.

In some embodiments, step 809 may be performed in response to determining that the channel condition metric is greater than the first threshold but is less than the second threshold.

At 811, the communication device may perform BFAS strategy of two level frame aggregation scheme. For example, the comparison that the estimated BER is smaller than the first threshold a may indicate that the channel condition is good, the BFAS strategy of the two level frame aggregation scheme may be used to reduce impact of the first lost sub-frame and reduce the transmission overhead. In some embodiments, the BFAS strategy of two level frame aggregation scheme may implement the maximum frame length of the A-MSDU and minimize the RAL of the second stage aggregation. In some embodiments, the BFAS strategy of two level frame aggregation scheme may be implemented based on equation 2.

$$L_{ral} = \min\left(\left\lfloor \frac{L_{AMPDU,max}}{\lfloor L_{AMSDU,max}/L_{subf} \rfloor * L_{subf}} \right\rfloor, L_{ral,max}\right), \quad (3)$$

where $L_{subf}$ is the size of the sub-frame; $L_{ral}$ may be the retransmission aggregation level of the second stage aggregation; $L_{ral,max}$ may be the maximum retransmission aggregation level; $L_{AMSDU,max}$ and $L_{AMPDU,max}$ may be the maximum aggregated frame lengths of the A-MSDU and the A-MPDU, respectively.

Figure 9:
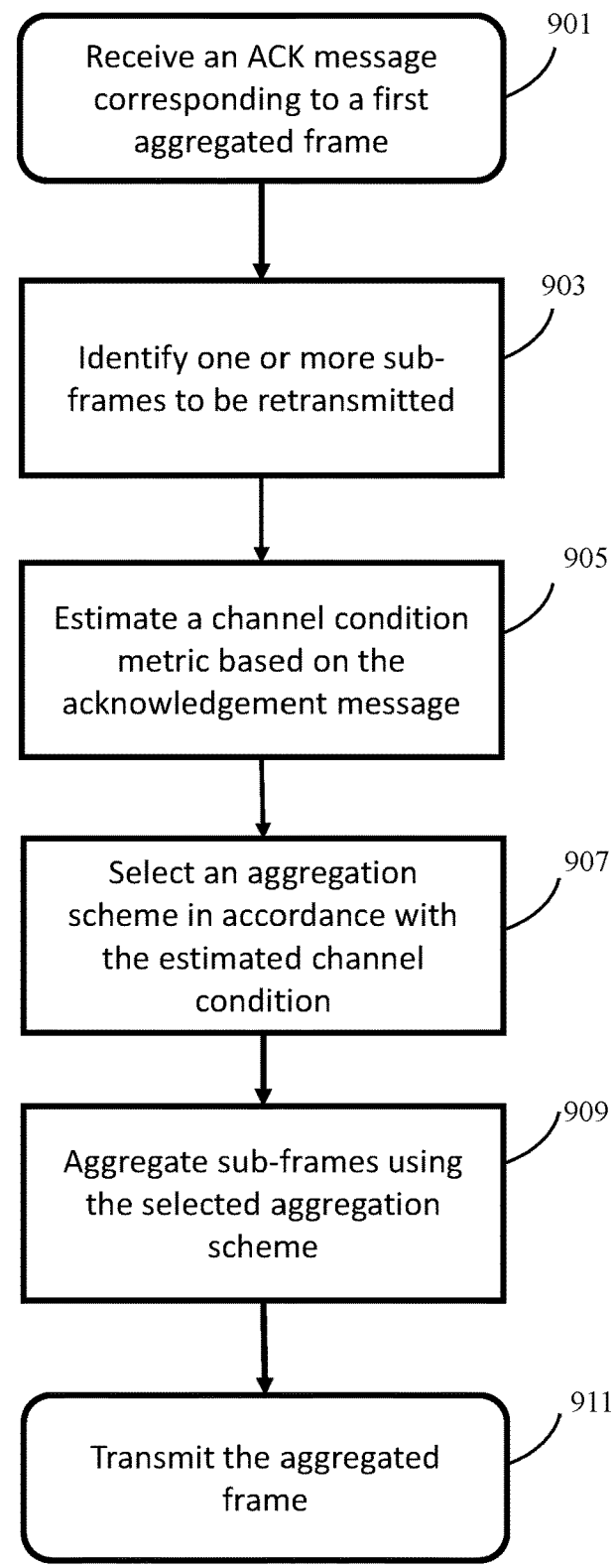
FIG. 9 is a flow chart illustrating another exemplary process of transmitting an aggregated frame according to some embodiments of the disclosed subject matter.

FIG. 9 is a flow chart illustrating an example 900 of a process 900 for frame transmission according to some embodiments of the disclosed subject matter. In some embodiments, process 900 can be executed by one or more hardware processors of a communication device as described in connection with FIGS. 1-3.

As illustrated, process 900 can begin by the communication device receiving an ACK message corresponding to a first aggregated frame at block 901. The acknowledgment message may include information that acknowledges receipt of one or more sub-frames of the first aggregated frame by a receiver device. The ACK message may include a Block-ACK that acknowledges receipt of multiple sub-frames of the first aggregated frame, such as a BlockAck illustrated in FIG. 5. The ACK message may be transmitted through a channel (e.g., a wireless channel, a wired channel, a Rayleigh fading channel, a Rice fading channel, a Gaussian channel, etc.).

At 903, the communication device can identify one or more sub-frames to be retransmitted. The sub-frame(s) may be defined based on the acknowledgement message and/or any other information about receipt of the sub-frames at the receiver. For example, the communication device may determine that a sub-frame is to be retransmitted when a bit in the bitmap corresponding to the sub-frame is "0" or any other value indicating that the sub-frame has not been received by the receiver and/or that the sub-frame was lost during transmission. In some embodiments, the corresponding bit in the bitmap may be selected based on one or more fields included in the sub-frame (e.g., a "position information" field, etc.). In some embodiments, the aggregation number of aggregated frame, for example, A-MPDU, may be keep the maximum number if the communication device has enough sub-frame for transmitting.

At 905, the communication device can estimate a channel condition metric based on the acknowledgement message. For example, the communication device may estimate channel condition based on the method as described in FIG. 7.

At 907, the communication device may select a frame aggregation scheme to transmit the identified sub-frames based on the estimated channel condition metric. For example, the communication device can compare the channel condition metric with one or more thresholds of network condition metric. The communication device can then select the frame aggregation scheme based on the comparison. The frame aggregation scheme may be selected from multiple candidate aggregation schemes that may be used to aggregate and/or transmit the sub-frames. Examples of the candidate aggregation schemes include an A-MSDU aggregation scheme, an A-MPDU aggregation scheme, a BFAS frame aggregation scheme, an MSAL frame aggregation scheme, etc.

More particularly, for example, the channel condition metric can be compared with a first threshold of network condition metric and a second threshold of metric condition metric. The second threshold may be greater than the first threshold in some embodiments. In response to determining that the network condition metric is less than the first threshold, the computing device can select the BFAS strategy of the two-level frame aggregation scheme. In response to determining that the network condition metric is greater than the second threshold, the computing device can select the A-MPDU aggregation scheme. Alternatively, the computing device may select the MSAL strategy of two-level frame aggregation scheme in response to determining that the network condition metric is greater than or equal to the first threshold and that the network condition metric is less than or equal to the second threshold.

In some embodiments, the selection can be made by performing one or more operations described in connection with FIG. 8 above.

At 909, the communication device may aggregate sub-frames using the selected aggregation scheme. The aggregation may be performed based on position information related to the sub-frames. In some embodiments, the position information may be included in a data field of each sub-frame, such as a MAC header of the sub-frame. The position information of a sub-frame may indicate the position of the sub-frame located in the aggregated frame.

At 911, the communication device can transmit the aggregated frame. For example, the aggregated frame can be propagated into a PHY layer for transmission.

Figure 10:
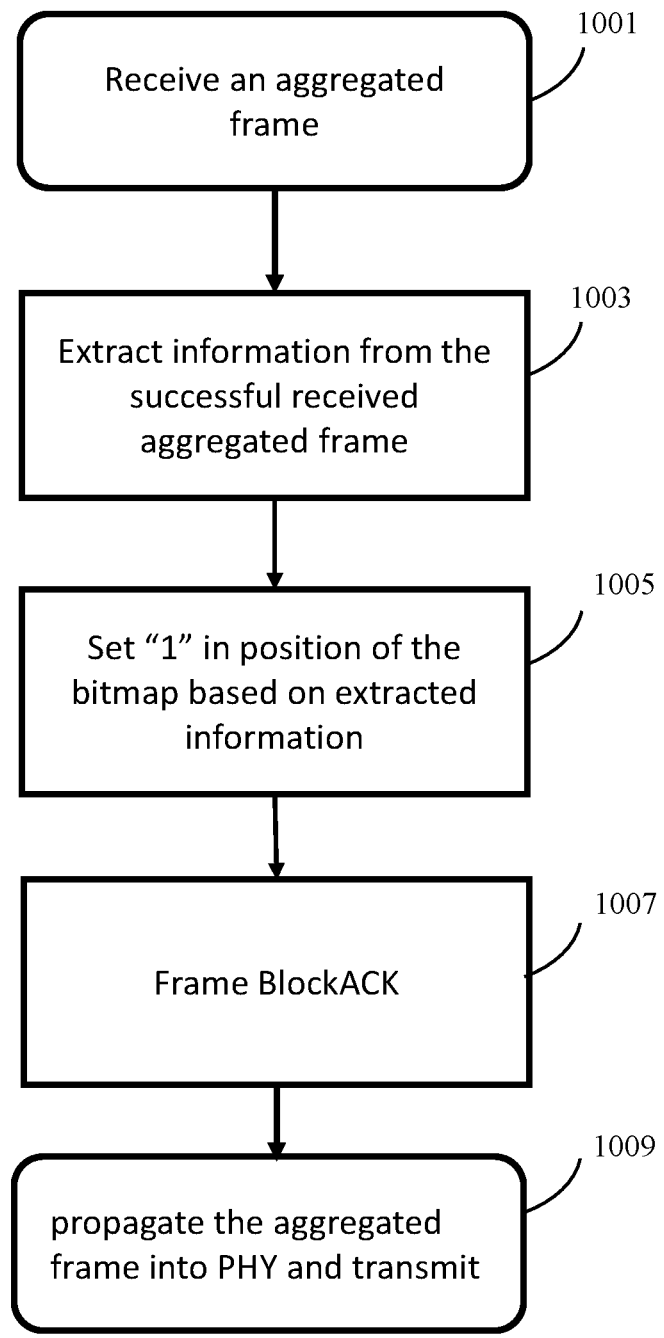
FIG. 10 is a flow chart illustrating an example of a process for receiving an aggregated frame according to some embodiments of the disclosed subject matter.

FIG. 10 is a flow chart illustrating an example 1000 of a process for receiving an aggregated frame according to some embodiments of the disclosed subject matter. In some embodiments, process 1000 can be executed by one or more hardware processors implementing a communication device described above in connection with FIGS. 1-5.

As illustrated, process 1000 can begin by the communication device receiving an aggregated frame at 1001. The aggregated frame may be transmitted through a channel (e.g., a wireless channel, a wired channel, a Rayleigh fading channel, a Rice fading channel, a Gaussian channel, etc.).

At 1003, the communication device may be configured to extract information from the successfully received sub-frame(s) in the received aggregated frame. In some embodiments, some sub-frames may not be received successfully in accordance with some reasons, for example, noise, interference, channel fading, transmission overhead, any/or any other reasons for affecting the transmission. In some embodiments, the extracted information may comprise sequence number, position information, receiver address, transmitter address, and/or any other information used for acknowledging the transmission.

At 1005, the communication device may be configured to set "1" in position of the bitmap, which may be corresponding to position of successful sub-frame in the aggregated frame, based on the extracted information.

At 1007, the communication device may be configured to frame the bitmap with other fields, for example, frame control, duration/ID, receiver address, transmitter address, BlockACK information and/or FCS, into a BlockACK.

At 1009, the communication device may be configured to propagate the BlockACK frame into the PHY layer for transmission.

Figure 11:
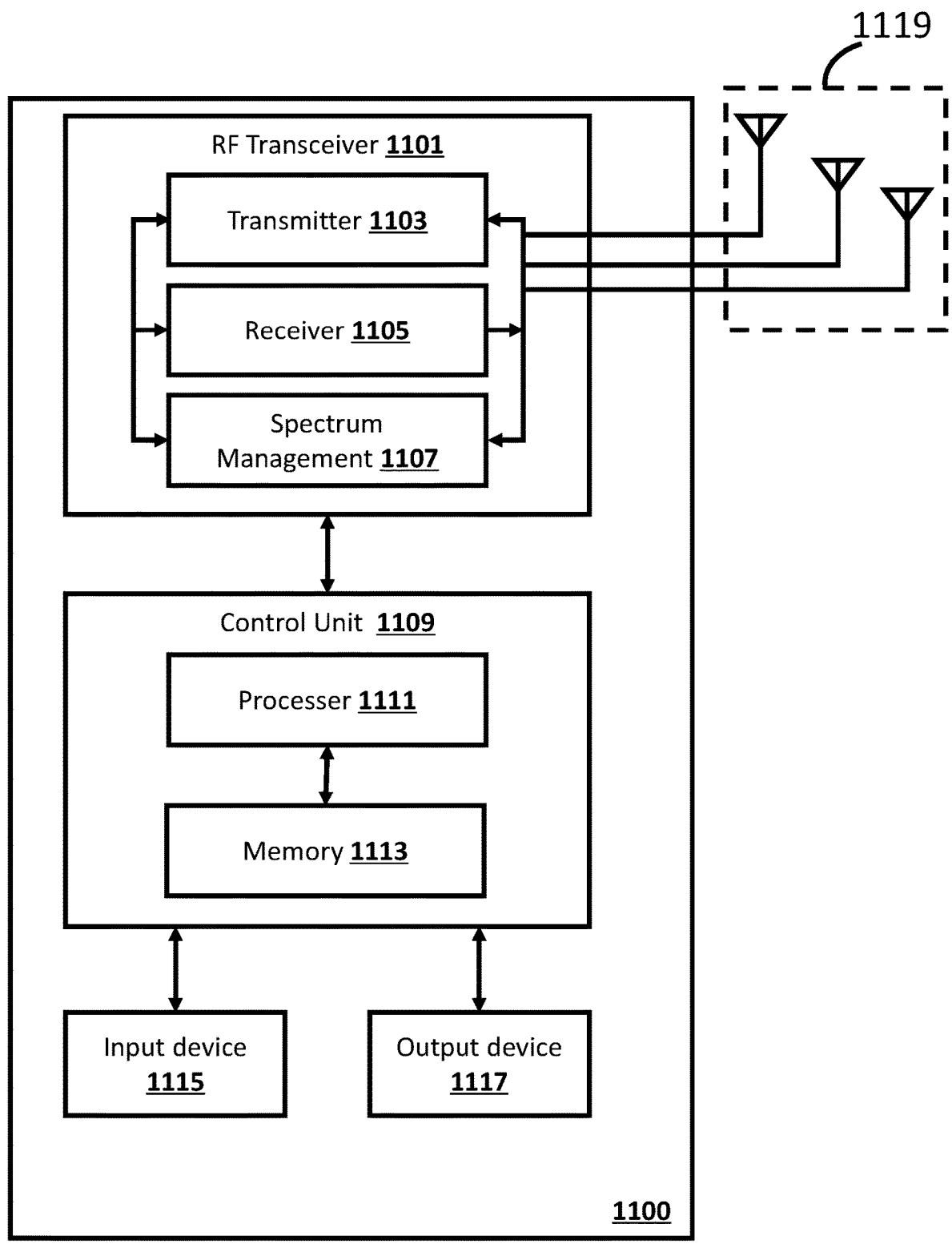
FIG. 11 is a schematic diagram illustrating an example of a communication device according to some embodiments of the disclosed subject matter.

FIG. 11 shows an exemplary function block diagram of a communication device 1100 according to some embodiments of the disclosed subject matter. For example, a communication device may include a RF transceiver 1101, a control unit 1109, an input device 1115, an output device 1117, one or more antennas 1119, and/or any other component for transmitting and/or receiving signals. The communication device 1100 may operate in a wireless network, such as a Wireless Local Area Network (WLAN), a Wireless Personal Area Network (WPAN) network, a Local Area Network (LAN), Metropolitan Area Network (MAN), and/or any other suitable communication networks, or a combination of such networks. Additionally, the communication device 1100 may also operate through any communication medium (e.g., one or more radio links, network links, dial-up links, wireless links, BluetoothlM links, hard-wired links, and any other suitable communication links, and/or a combination of such links). The communication device 1100 may be any type of device capable of communicating in an RF/location space with another communication device that is capable of using an algorithm that monitors and controls frame aggregation techniques to improve the performance and effective throughput in networks.

As illustrated, the RF transceiver 1100 may include transmitter 1103, receiver 1105, spectrum management 1107, and/or any other component for transmitting or receiving signals. The transmitter 1103 and the receiver 1105 may be configured to allow transmission and reception of data between the communication device 1100 and another devices. In some embodiments, the communication device 1100 may include (not shown) multiple transmitters, multiple receivers, and multiple RF transceivers.

The spectrum management 1107 may be used to monitor characteristics of used communications channel and adjacent channels. In some embodiments, the spectrum management 1107 may cognitively monitor channel characteristics such as channel signal power, signal to noise rate (SNR), and/or any other characteristics to gather parameters and make determinations about the quality of the used communication channel and the adjacent channels. In some embodiments, the spectrum management 1107 may use the channel parameters to switch transmission energy profiles in accordance with deteriorating channel conditions. Additionally, the spectrum management 1107 may calculate an indicator value of the channel quality directly from a received packet or signal. Alternatively, at least one packet may be transmitted over a channel and an indicator value of the channel quality based on the packet transmitted may be received in return.

As illustrated, the control unit 1109 may include one or more processors 1111, memory 1113, and/or any other component. The processor(s) 1111 may be used to control operation of the communication device 1100, such as fetching instructions, generating decodes, finding operands, and/or any other appropriate operations for implementing the communication device. In some embodiments, the processor(s) 1111 may be and/or include a central processing unit (CPU). The processor(s) 1111 may exchange data with memory 1113, which may include a Random Access Memory (RAM), a Read Only Memory (ROM), a nonvolatile memory, NOR flash memory, NAND flash memory, Dynamic Random Access Memory (DRAM), Static Random Access Memory (SRAM), Synchronous Dynamic Random Access Memory (SDRAM), or the like, or any combination thereof.

The communication device 1100 may also receive signals input by a user through the input device 1115, such as a keyboard, a mouse, a touch panel, a Mike, a visual device, or the like, or any combination thereof. Additionally, the communication device 1100 may output data through the output device 1117, such as a monitor or a speaker.

The communication device 1100 may utilize one or more antennas in block 1119 at both the transmitter and receiver side to provide the transmission and reception. The communication device 1100 may comprise a number of types of antenna including an omni-directional antenna, a directional antenna, a high-gain antennas, among others, and a combination of antenna of various types.

Figure 12:
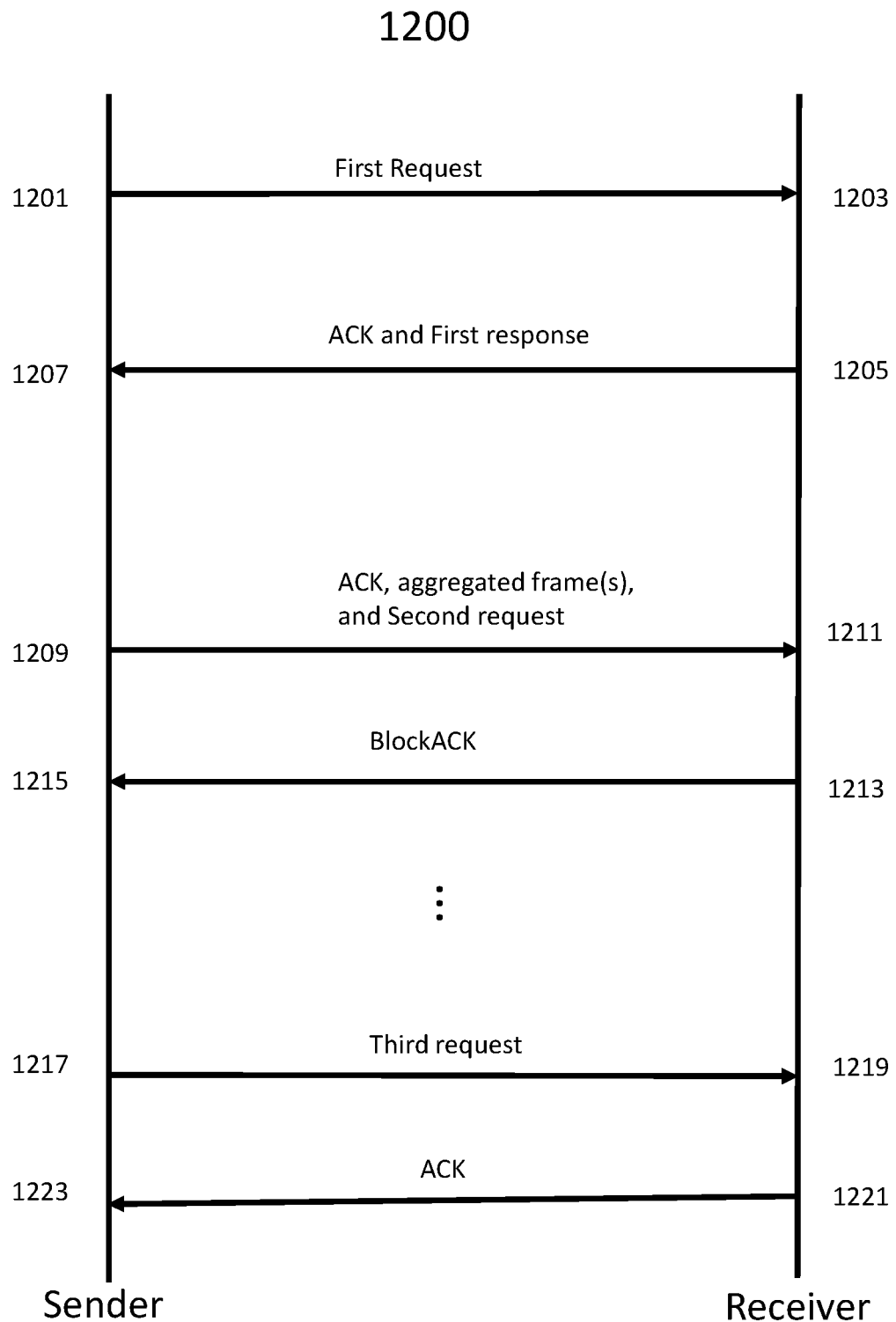
FIG. 12 is a flow chart illustrating an example of a process for transmitting an aggregation frame in accordance with some embodiments of the disclosed subject matter.

FIG. 12 shows an example 1200 of a process for transmitting an aggregation frame in accordance with some embodiments of the disclosed subject matter. In some embodiments, process 1200 can be implemented using a transmitter and a receiver, each of which can include a hardware processor. For example, process 1200 can be implemented using the communication device of FIGS. 1-5 and 11 as a sender or a receiver.

As illustrated, process 1200 can begin by a sender device transmitting a first request to a receiver at 1201. In some embodiments, the first request can include any suitable information. For example, the first request can include a category field, an Action field, a Dialog token field, parameter set field, a Timeout Value field, a starting sequence control field, and/or any other suitable information. In a more particular example, the category field may be set to 3 (representing Block ACK) and the Action field may be set to 0 (representing Add BlockACK (ADDBA) request).

In some embodiments, upon receiving the first request at 1203, a receiver device may analyze the first request. For example, the receiver can parse the first request and can extract one or more values of data fields of the first request. The value(s) may be used to identify a transmission scheme in some embodiments.

In some embodiments, the receiver device can transmit a first ACK message and a first response to the sender at 1205. The first ACK message may include information that acknowledges the receipt of the first request. The first ACK message may be and/or include an ACK frame that may be integrated with the first response.

The sender device can receive the first response and/or the first ACK message at 1207. The sender device can then generate one or more responses to the first request. For example, the sender device can generate one or more aggregated frames using one or more aggregation schemes described above. The sender device can also generate a second ACK message that acknowledges receipt of the first response.

At 1209, the sender device can transmit, to the receiver device, the second ACK message, one or more aggregated frames, and/or a second request. The second request may be a BlockACK request. The second ACK message, the aggregated frames, and/or the second request may be transmitted using one or more messages.

At 1211, the receiver device can receive the aggregated frames, the second ACK message, and/or the second request. The receiver can then analyze the received information. For example, the receiver device can parse the second ACK message and/or the second request and can extract one or more values of data fields of the first request and data information from the aggregated frames. The value(s) and/or the state whether the data information is extracted successfully or not may identify the next process in some embodiments.

In some embodiments, the receiver device may transmit a second response to the sender device at 1213. The second response may include a BlockACK that acknowledges the receipt of the aggregated frames.

The sender device can receive the second response at 1215. The sender device can then analyze the second response. For example, the sender device may extract the information of the second response and determine the retransmission frames. The sender device may execute steps 1209-1215 iteratively until a condition is satisfied. For example, the condition may be and/or include transmission and/or receipt of a message including information indicating that the transmission is to be terminated (e.g., a request to terminate the transmission generated and/or transmitted by the sender device). As another example, the condition may be and/or include execution of a certain number of iterations of steps 1209-1215.

In some embodiments, the sender device may generated and/or transmit a third request to the receiver device. The third request may include a request to terminate the transmission.

The receiver device may receive the third request and may then analyze and extract the information of the third request at 1219. In some embodiments, the receiver device may transmit an ACK signal to the sender device in response to receiving the information of the third request at 1221.

In some embodiments, the sender device may receive the ACK signal and may terminate the transmission at 1223.

Although the invention has been described and illustrated in the foregoing illustrative implementations, it is understood that the present disclosure has been made only by way of example, and that numerous changes in the details of implementation of the invention can be made without departing from the spirit and scope of the invention, which is limited only by the claims that follow. Features of the disclosed implementations can be combined and rearranged in various ways.

The terms "first," "second," "third," "fourth," etc. as used herein are meant as labels to distinguish among different elements and may not necessarily have an ordinal meaning according to their numerical designation.

In some implementations, any suitable computer readable media can be used for storing instructions for performing the processes described herein. For example, in some implementations, computer readable media can be transitory or non-transitory. For example, non-transitory computer readable media can include media such as magnetic media (such as hard disks, floppy disks, etc.), optical media (such as compact discs, digital video discs, Blu-ray discs, etc.), semiconductor media (such as flash memory, electrically programmable read only memory (EPROM), electrically erasable programmable read only memory (EEPROM), etc.), any suitable media that is not fleeting or devoid of any semblance of permanence during transmission, and/or any suitable tangible media. As another example, transitory computer readable media can include signals on networks, in connectors, conductors, optical fibers, circuits, any suitable media that is fleeting and devoid of any semblance of permanence during transmission, and/or any suitable intangible media.

What is claimed is:

1. A system for frame aggregation and transmission, comprising:
   a memory; and
   a processor operatively coupled to the memory to:
   estimate a channel condition metric indicative of at least one channel condition;
   select at least one frame aggregation scheme from a plurality of aggregation schemes based on the channel condition metric, wherein the plurality of aggregation schemes include at least one of a two-level aggregation scheme, wherein the two-level aggregation scheme comprises a maximum second stage aggregate level (MSAL) strategy aggregation scheme and a biggest first stage aggregate size (BFAS) strategy aggregation scheme, the MSAL strategy aggregation scheme decreases a first stage aggregation frame length of the two-level aggregation scheme, and the BFSA strategy aggregation scheme performs first stage frame aggregation of the two-level aggregation scheme based on a maximum frame length; and
   perform frame aggregation based on the selected frame aggregation scheme.

2. The system of claim 1, wherein the processor is further to:
   receive an acknowledge message comprising information indicative of receipt of at least one sub-frame of a first frame; and
   determine the channel condition metric based on the acknowledge message.

3. The system of claim 2, wherein the acknowledgment message comprises a block acknowledgement (BlockAck) message.

4. The system of claim 3, wherein to perform the frame aggregation based on the selected frame aggregation scheme, the processor is further to:
   identify the at least one sub-frame of the first frame based on a bitmap in the acknowledgement message, wherein the bitmap comprises position information related to the at least one sub-frame; and
   aggregate the identified sub-frame into a second frame for retransmission.

5. The method of claim 4, wherein the at least one sub-frame is identified based on a bit value of a position in the bitmap that corresponds to the at least one sub-frame.

6. The system of claim 4, wherein the position information is included in a media access control (MAC) header of the at least one sub-frame.

7. The system of claim 1, wherein to select the at least one frame aggregation scheme, the processor is further to:
   compare the channel condition metric with a first threshold; and
   select the at least one frame aggregation scheme based on the comparison.

8. The system of claim 7, wherein to select the at least one frame aggregation scheme, the processor is further to:
compare the channel condition metric with a second threshold; and
select the at least one frame aggregation scheme in response to determining that the channel condition metric is not less than the first threshold and that the channel condition metric is not greater than the second threshold.

9. A method for a processor coupled to a memory performing frame aggregation and transmission, comprising:
estimating a channel condition metric indicative of at least one channel condition;
selecting at least one frame aggregation scheme from a plurality of aggregation schemes based on the channel condition metric, wherein the plurality of aggregation schemes include at least one of a two-level aggregation scheme, wherein the two-level aggregation scheme comprises a maximum second stage aggregate level (NASAL) strategy aggregation scheme and a biggest first stage aggregate size (BFAS) strategy aggregation scheme, the MSAL strategy aggregation scheme decreases a first stage aggregation frame length of the two-level aggregation scheme, and the BESA strategy aggregation scheme performs first stage frame aggregation of the two-level aggregation scheme based on a maximum frame length; and
performing frame aggregation based on the selected frame aggregation scheme.

10. The method of claim 9, further comprising: receiving an acknowledge message comprising information indicative of receipt of at least one sub-frame of a first frame and determining the channel condition metric based on the acknowledge message.

11. The method of claim 10, wherein the acknowledgment message comprises a block acknowledgement (BlockAck) message.

12. The method of claim 11, further comprising:
identifying the at least one sub-frame of the first frame based on a bitmap in the acknowledgement message, wherein the bitmap comprises position information related to the at least one sub-frame and aggregating the identified sub-frame into a second frame for retransmission.

13. The method of claim 12, wherein the at least one sub-frame is identified based on a bit value of a position in the bitmap that corresponds to the at least one sub-frame.

14. The method of claim 12, wherein the position information is included in a media access control (MAC) header of the at least one sub-frame.

15. The method of claim 9, wherein the selecting the at least one frame aggregation scheme further comprises:
comparing the channel condition metric with a first threshold; and
selecting at least one frame aggregation scheme based on the comparison.

16. The method of claim 15, wherein the selecting the at least one frame aggregation scheme further comprises:
comparing the channel condition metric with a second threshold; and
selecting at least one frame aggregation scheme in response to determining that the channel condition metric is not less than the first threshold and that the channel condition metric is not greater than the second threshold.

\* \* \* \* \*